United States Patent
Debergh

(10) Patent No.: US 11,420,168 B2
(45) Date of Patent: Aug. 23, 2022

(54) MIXING MACHINE AND RELATED METHODS

(71) Applicant: Industrial Machineries Ltd., Sofia (BG)

(72) Inventor: Ludo Debergh, Dalhem (BE)

(73) Assignee: Industrial Machineries Ltd., Sofia (BG)

( * ) Notice: Subject to any disclaimer, the term of this patent is extended or adjusted under 35 U.S.C. 154(b) by 200 days.

(21) Appl. No.: 16/648,073

(22) PCT Filed: Jul. 27, 2018

(86) PCT No.: PCT/IB2018/055637
§ 371 (c)(1),
(2) Date: Mar. 17, 2020

(87) PCT Pub. No.: WO2019/058190
PCT Pub. Date: Mar. 28, 2019

(65) Prior Publication Data
US 2020/0276547 A1    Sep. 3, 2020

(30) Foreign Application Priority Data
Sep. 19, 2017    (BE) .................................. 2017/5662

(51) Int. Cl.
*B01F 15/00* (2006.01)
*B29B 7/80* (2006.01)
(Continued)

(52) U.S. Cl.
CPC .......... *B01F 35/122* (2022.01); *B01F 27/625* (2022.01); *B01F 27/703* (2022.01);
(Continued)

(58) Field of Classification Search
CPC .......... B01F 15/00051; B01F 15/00545; B01F 2215/0049; B01F 2215/0422;
(Continued)

(56) References Cited

U.S. PATENT DOCUMENTS 3,393,052 A * 7/1968 Axelsson ................ B29B 7/404
422/133
4,154,287 A * 5/1979 Kharagezov .......... B29C 67/241
425/551
(Continued)

FOREIGN PATENT DOCUMENTS

DE    2703755 A1    8/1978
DE    2757070 A1    7/1979
(Continued)

OTHER PUBLICATIONS

International Search Report and Written Opinion pertaining to PCT/IB2018/055637, filed Jul. 27, 2018, dated Oct. 4, 2018.
(Continued)

*Primary Examiner* — Elizabeth Insler
(74) *Attorney, Agent, or Firm* — Dinsmore & Shohl LLP

(57) ABSTRACT

A mixing machine (1) for the mixing of a homogeneous mixture with one or more components to obtain a viscous mixture, comprising a mixing chamber (2) which is divided in a push (A), a mixing (B) and a discharge zone (C), and wherein the mixing chamber (2) comprises the following parts: multiple walls, consisting of one or more top plates (22) with multiple inflow channels (10, 11, 12), one or more bottom plates (24) and multiple side walls (6); an outlet mouth (18); an outlet valve (13); several rotors (5); in and out sliding push and/or mixing blades (3, 4); and a self-cleaning system (16, 17); characterised in that the rotors (5) are integrated in the side walls (6) of the mixing chamber (2); the rotors are equipped with transit channels (30) for the in and out sliding push or mixing blades (3, 4); and the
(Continued)

self-cleaning system comprises a cleaning plate (16) and a driving mechanism (17) wherein the cleaning plate (16) can move longitudinally through the mixing chamber (2).

20 Claims, 6 Drawing Sheets

(51) Int. Cl.
| | |
|---|---|
| *B29B 7/90* | (2006.01) |
| *B29B 7/38* | (2006.01) |
| *B01F 7/02* | (2006.01) |
| *B01F 7/04* | (2006.01) |
| *B01F 7/10* | (2006.01) |
| *B01F 35/12* | (2022.01) |
| *B01F 27/73* | (2022.01) |
| *B01F 27/60* | (2022.01) |
| *B01F 27/703* | (2022.01) |
| *B01F 35/32* | (2022.01) |
| *B01F 101/00* | (2022.01) |

(52) U.S. Cl.
CPC ........ *B01F 27/73* (2022.01); *B01F 35/32045* (2022.01); *B29B 7/38* (2013.01); *B29B 7/805* (2013.01); *B29B 7/90* (2013.01); *B01F 2101/2805* (2022.01); *B01F 2215/0422* (2013.01); *B01F 2215/0431* (2013.01)

(58) Field of Classification Search
CPC .... B01F 2215/0431; B01F 7/043; B01F 7/10; B01F 35/122; B29B 7/38; B29B 7/805; B29B 7/90; B29B 7/7433; B29B 7/7404
See application file for complete search history.

(56) References Cited

U.S. PATENT DOCUMENTS

| | | | | |
|---|---|---|---|---|
| 7,553,066 B2* | 6/2009 | Fiorentini | ............ | B29B 7/7694 366/162.5 |
| 2008/0310253 A1* | 12/2008 | Hayashi | .................. | B29B 7/401 366/343 |
| 2016/0031007 A1* | 2/2016 | Cooper | .................. | B22D 37/00 266/236 |
| 2020/0276547 A1* | 9/2020 | Debergh | ........... | B01F 15/00545 |
| 2021/0322939 A1* | 10/2021 | Menk | .................. | B01F 7/00633 |

FOREIGN PATENT DOCUMENTS

| | | |
|---|---|---|
| DE | 3021095 A1 | 12/1981 |
| DE | 19608187 C1 | 8/1997 |
| DE | 102011012287 A1 | 8/2012 |
| EP | 1927448 A3 | 6/2008 |
| EP | 2357071 A1 | 8/2011 |
| KR | 101458613 B1 | 11/2014 |
| WO | 2011130901 A1 | 10/2011 |

OTHER PUBLICATIONS

Other Search Report pertaining to BE application No. 201705662, filed Sep. 19, 2017, dated Apr. 12, 2018.

\* cited by examiner

MIXING MACHINE AND RELATED METHODS

SCOPE OF THE INVENTION

This invention discloses the mixing of all types of granules with a binding agent to obtain a viscous mixture. More specifically the invention discloses a new mixing machine for mixing coarse to very fine granules and/or grit of materials with the necessary ingredients as a binding agent to obtain a viscous homogeneous mixture and a method to produce an object with this mixture.

BACKGROUND OF THE INVENTION

Diverse methods and machines for the production of objects from a viscous mixture are already known. Hereby a filler material is often used to obtain a certain volume, to which possibly fibres are added to increase the strength and to which a binding agent is added to keep it all together. These mixing machines are mostly built from a filling unit, e.g. a trough-shaped container in which a mixer with a certain shape operates at a certain rpm, or for example, a tube in which a mixer with various shapes operates at a certain rpm. With all these machines after the mixing procedure there is always a quantity of mixture left over that can be removed from either the machine tube or container. In addition, it is necessary to remove from the mixer all leftover mixture that has stuck to the mixer during the mixing procedure. This can be done by flushing the machine dry with granules without binding agents, which can cause wear and tear to the parts of the mixer, for example a concrete mixing tube from which the cement scale needs to be removed from the mixing blades of the mixer.

Examples of such mixing machines are machines for mixing gravel with cement and water, plastic granules with polyester resins, polyol and isocyanate, or granules from wood splinters with glue resins etc. After the mixing of the dry homogeneous mixture with the matching binding agents a viscous homogeneous mixture is obtained. From this viscous homogeneous mixture an object is formed by curing the mixture in a matrix whereby a certain temperature and/or pressure are applied during a certain time.

In all of these mixing machines all types of granules are used to which binding agents are added to obtain a viscous mixture, whether wet or dry, with which objects can be made. There are different methods by which a certain quantity of binding agents are added to a homogeneous mixture. The homogeneous mixture is on the one hand made up of granules with a specific diameter of e.g. 0 mm to e.g. 5 mm, depending on the structure and the previously determined porosity that the object to be made must take on.

This homogeneous mixture can include a certain moisture content. After mixing the dry homogeneous mixture with the binding agents, a viscous homogeneous mixture is obtained. With this viscous homogeneous mixture an object is subsequently formed e.g. by curing the mixture in a matrix whereby a certain temperature and pressure are applied during a certain time, e.g. a concrete beam or e.g. by kneading the mixture and placing it in a baking tray until an object is obtained such as, for example, a loaf of bread.

The current new invention aims to solve the problems of the mixing machines that are already available. The new invention allows coarse to very fine granules and/or grit from solids in all possible proportions to be mixed in a mixing chamber with, for example, water, polyester resins, polyurethane (PU) components, or other components, wherein blockages, bad mixing and rapid wear are avoided by using a new type of mixing machine in which a self-cleaning system is integrated.

SUMMARY OF THE INVENTION

The present finding describes a mixing machine for mixing a homogeneous mixture with one or more components to obtain a viscous mixture. This homogeneous mixture can be either a wet or a dry homogeneous mixture. It discloses a mixing machine for mixing a quantity of coarse to very fine granules and/or grit from solids that form a homogeneous mixture, in which the coarse granules, fine granules and/or the grit can take all possible proportions in the mix. The homogeneous mixture will preferably contain particles, e.g. hard plastics particles, of which ideally fibres can also be a part and even more preferably the homogeneous mixture will contain suitable recycled particles of a material such as for example, gravel, wood, polyester, polyurethane, or other granules, that along with the ingredients necessary for these particles, can be mixed as a binding agent into a homogeneous viscous mixture. This viscous mixture can be used for the production of objects using a mould or a matrix that satisfies the standards determined in advance with the previously determined surface structures.

In a special and specific embodiment the present invention discloses a mixing machine to mix a dry homogeneous mixture, made up of coarse to very fine granules and/or grit from solids, with or without fibres, with the ingredients for example necessary for a polyester composition, a polyurethane composition, namely isocyanate and polyol, or for a wood composition, such as wood chippings with glue resins, or a cement composition such as sand with gravel and cement.

In yet another embodiment, the mixing machine discloses, according to the present invention, a mixing machine to mix a homogeneous mixture made up of flour, water and other possible components, from which the outflowing mixture is in the form of dough and can be utilised in all types of baking trays, such as, for example, bread trays.

What is special to this mixing machine is the presence of a self-cleaning system consisting of a cleaning plate driven by a cylinder, and several specific rotors with push and/or mixing blades that ensure that the homogeneous mixture, after sufficient mixing, is pushed out to the outlet mouth of the mixing chamber wherein after each mixing cycle there is absolutely no mixture left over in the mixing chamber.

This invention comprises a mixing machine (1) for mixing a homogeneous mixture with one or more components to obtain a viscous mixture, wherein the mixing machine (1) comprises a mixing chamber (2) which is divided into a push (A), a mixing (B) and a discharge zone (C), and wherein the mixing chamber (2) comprises the following parts: several walls, made up of one or more top plates (22) with several inflow channels (10, 11, 12), one or more bottom plates (24) and several side walls (6); an outlet mouth (18); an outlet valve (13); multiple rotors (5); in and out sliding push and/or mixing blades (3, 4); and a self-cleaning system (16, 17). Typical for this invention is that the rotors (5) are integrated in the side walls (6) of the mixing chamber (2) and that these rotors (5) feature transit channels (30) for the in and out sliding push and/or mixing blades (3, 4). Furthermore, the self-cleaning system comprises a cleaning plate (16) and a driving mechanism (17) wherein the cleaning plate (16) can move longitudinally through the mixing chamber (2).

Typical for this invention are the in and out sliding push and/or mixing blades (3, 4) that ensure that a homogeneous mixture is formed from all components, that is pushed out to the outlet mouth (18) of the mixing chamber (2) after sufficient mixing. In another embodiment of this invention, the in and out sliding push and/or mixing blades (3, 4) are at one extremity connected to a driving mechanism outside the mixing chamber.

In a specific embodiment this driving mechanism comprises rotors (5) and rotor discs (7') wherein these rotor discs (7') in turn are connected to gear discs (7), which are driven by gears (9) via transmissions (T). These transmissions (T) can be selected from axles, chains, timing belts, bearings and motors (8). This driving mechanism ensures the rotational movement of the push and mixing blades (3, 4). In particular the rotors (5) are attached with ball bearings in the side walls (6) of the mixing chamber (2) and are driven by the push and/or mixing blades (3, 4), also called 'rotor blades', wherein these push and/or mixing blades (3, 4) are attached to rotor discs (7') that in turn are attached to gear discs (7). These gear discs (7) are driven by gears (9) via transmissions (T) selected from axles, chains, timing belts, bearings and motors (8).

In another specific embodiment the driving mechanism comprises rotors (5) and rotor discs (7') wherein the rotor discs (7') are directly connected with the drive motors (8). In this embodiment the rotors (5) and rotor discs (7') are directly driven by motors (8). Also in this embodiment, the rotors (5) are attached with ball bearings in the side walls (6) of the mixing chamber (2) and are driven by the push and/or mixing blades (3, 4), also called 'rotor blades', wherein these push and/or mixing blades (3, 4) are attached to rotor discs (7') that in turn are attached to the motors (8) without the need for gear discs (7), underlying shafts, belts, chains or additional gear wheels.

In another embodiment, according to this invention, the driving mechanism of the mixing machine comprises ways to achieve the in and out sliding of the push and/or mixing blades (3, 4) through the transit channels (30) in the mixing chamber. In a special embodiment the axial in and out sliding of the push and/or mixing blades (3, 4) occurs by means of hydraulic cylinders, compressed air cylinders or a mechanical construction driven by a motor or manually (15); in particular using hydraulic cylinders (15) or a mechanical drive such as a worm gear. These cylinders or constructions are attached to bearers (14), which together push the push and mixing blades (3, 4) via the transit channels through the rotors (5) from their starting position towards the back until they are completely removed from the mixing chamber (2) up to the same level as the inside of the side walls (6) of the mixing chamber (2).

In yet another embodiment special sealing rings are present in the transit channels (30). These sealing rings can be made from various types of material such as Viton® or Teflon®. Between the turning rotors (5) and the inner side of the side walls of the mixing chamber, particularly in the transit channels (30), the tolerance should be kept as little as possible in order to avoid any infiltration of the mixture by components such as dust and/or fluids.

As already explained above, this invention comprises in and out sliding push and/or mixing blades (3, 4) which are attached to a driving mechanism at one extremity outside the mixing chamber (2). In another embodiment this driving mechanism is mounted left and right of the mixing chamber (2) on respectively a left and right moveable foot plate (20). In another embodiment the foot plates (20) are slidable and connected with each other via guides (21), including guidance rods and recesses, on the underlying bottom plate (24). The movement of the movable foot plates (20) can occur by using a driving mechanism (15), in particular using hydraulic cylinders or compressed air cylinders or other constructions that can be driven mechanically or manually. This movement of the foot plates is mostly important for starting the self-cleaning system (16, 17) wherein push and mixing blades (3, 4) are slided out of the mixing chamber (2) and after which the cleaning plate (16) can move longitudinally through the mixing chamber (2).

In another embodiment the transit channels (30) for the in and out sliding push and/or mixing blades (3, 4) are funnel-shaped. In yet another embodiment, the tolerance between the diameters of the push and mixing blades and the respective transit channels in their matching rotors should be kept as small as possible. The tolerance will preferably be less than 0.05 mm, and even better, less than 0.02 mm. The purpose of this is to let the funnel-shaped transit channel act as a scraping knife and to scrape off all scale that is left behind on the rim and surfaces of the push and mixing blades after a mixing cycle during their axial sliding, and therefore leaving the scale in the mixing chamber (2). The transit channel has a sort of funnel shape wherein the friction surface between the push and mixing blades and the contact surface of the transit channel is kept as small as possible, to avoid wear and tear of both parts as much as possible and to allow the axial movement of the push and mixing blades in the funnel-shaped transit channels to run smoothly. The funnel-shaped transit channel can also be made by using a special hard metal insert in the rotor. Therefore, only the insert will need to be replaced in the rotor if there is wear and tear, and not the entire rotor.

According to this invention, the mixing machine comprises a mixing chamber (2) which is divided into a push (A), a mixing (B) and a discharge zone (C), wherein the mixing chamber (2) contains one or more top plates (22) with several inflow channels (10, 11, 12). In another embodiment the top plate (22) at the level of the push zone (A) is equipped with an inflow channel (10) for the dry mixture. In yet another embodiment the top plate (22) at the level of the mixing zone (B) is equipped with two, three or more inflow channels (11, 12) for the delivery of one or more components, in particular for the delivery of one or more binding agent components; for example, for the delivery of polyester resins and a hardener.

Also typical for this invention is that in every push, mixing and discharge zone, one or two or more rotors with matching in and out sliding push and/or mixing blades (3, 4) are present. In a specific embodiment, at the level of the push zone (A), the mixing chamber (2) of the mixing machine contains one or more rotors (5); preferably two rotors (5), which include one or more push blades.

In another embodiment, at the level of the mixing zone (B), the mixing chamber (2) contains two or more rotors (5); preferably three or more rotors (5), which include one or more mixing blades. In yet another embodiment the mixing chamber (2) at the level of the outflow zone (C) contains one or more, preferably two, rotors (5) which include one or more push blades. In yet another embodiment, the rotors are separately adjustable in rpm and in rotation direction.

Another advantage of the presence of 3 zones, namely the inflow zone (A), mixing zone (B) and outflow zone (C), in this mixing machine is that the duration that the mixing components must spend in the mixing chamber can be controlled separately in the three different zones of the mixing chamber. It is important that the time spent in the mixing chamber by the ingredients, for example those needed for making the polyurethane composition, is shorter than the time needed for curing the composition. The curing time of a composition is dependent on a number of factors such as the properties of the ingredients including the humidity level and the temperature. The humidity level of the ingredients, for example for a polyester composition, cannot necessarily be kept constant. For these reasons it is important that the time spent in the different zones can be adapted. This is made possible by adjusting the various rotor speeds and their rotation direction in the different zones of the mixing chamber. Particular attention has been paid to allowing the time spent to be adjusted without jeopardising the achievement of sufficient mixing. Furthermore, according to the present invention, the time spent in the mixing chamber can be adjusted even more precisely by adjusting the back pressure with which the outlet valve of the mixing chamber presses against the outlet mouth.

An important characteristic of this invention is the presence of a self-cleaning system (16, 17) in the mixing machine. This self-cleaning system comprises a cleaning plate (16) and a driving mechanism (17) wherein the cleaning plate (16) can move longitudinally through the mixing chamber (2). In another embodiment the cleaning plate (16) has a rim that differs by maximum 2 mm, preferably maximum 1 mm, even more preferably maximum 0.5 mm, from the inner rim of the mixing chamber (2).

In another embodiment the cleaning plate (16) is set up at an angle of 65° to 85°, preferably at an angle of around 75° to the bottom plate (24) of the mixing chamber (2). The presence of the self-cleaning system (16, 17) ensures that a cleaning procedure can be carried out after every mixing cycle. This ensures that, after the mixing cycle, there will be no leftover scale from the cured composite material on the interior walls of the mixing chamber and on the smooth surfaces of the moving parts in the mixing chamber. This invention offers a mixing machine with a built-in self-cleaning system wherein all scale from curing composite material is eliminated. The mixing machine has therefore the great advantage that the interior of the mixing chamber cannot get dirty any more after a mixing cycle so that the mixing machine remains continuously operational and the complete continuity of the mixing process is guaranteed.

Important to note for this invention is that the interior walls of the mixing chamber and all the moving parts in it that come into contact with the ingredients needed for the viscous mixture, during the mixing process, in particular for example a polyester mixture, are made of a hard, smooth type of metal that does not show any significant adhesion with the curing polyester. In a specific embodiment, e.g. when the mixing machine is implemented in the food industry, all interior walls of the mixing chamber and all moving parts in it that come into contact with the ingredients, needed for the viscous mixture, during the mixing process are made from, for example, stainless steel.

This invention also comprises a method for mixing a homogeneous mixture with one or more components using a mixing machine according to one of the previous embodiments wherein the homogeneous mixture in the mixing chamber (2) is added via an input channel (10) at the level of the push zone (A), wherein one or more components are added via input channels (11, 12) at the level of the mixing zone (B), and wherein using a forward pushing rotation movement of the rotors (5) and the matching push and/or mixing blades (3, 4) everything is mixed to a homogeneous mixture and pushed forward in the direction of the discharge zone and finally to the outlet mouth (18). In an additional embodiment using this method the mixing of a homogeneous mixture also takes place at the level of the push zone (A).

Furthermore the present invention comprises a method for the cleaning of a mixing machine according to one of the previous embodiments, wherein the cleaning system is set to work immediately after every mixing cycle and wherein the push and mixing blades slide sideways via the transit channels (30) and leave the mixing chamber this way, and wherein the cleaning plate subsequently travels downstream in the mixing chamber (2). In another embodiment the present invention includes a method for the cleaning of a mixing machine according to one of the previous embodiments, wherein the cleaning system is set to work immediately after every mixing cycle, manually or automatically, and wherein the push and mixing blades slide sideways via the transit channels (30) and leave the mixing chamber this way, and wherein the cleaning plate subsequently travels downstream in the mixing chamber (2).

Finally, the present invention comprises a method for cleaning a mixing machine according to one of the previous embodiments, wherein the top plate (22) of the mixing chamber (2) is removed, the side walls (6) of the mixing chamber are moved and the push and/or mixing blades (3, 4) are dismantled for external cleaning or replacement.

BRIEF DESCRIPTION OF THE FIGURES

With reference to the figures, it will be evident to the professional that the attached figures are merely illustrative of an embodiment according to the present invention, and that the latter is in no way restricted at any moment to the details of these embodiment(s) but also extends to other equivalent embodiments which incorporate the innovative contribution of the invention. The scope of the invention is given by the attached claims and includes all modifications within the meaning and scope of equivalence of the claims.

DETAILED DESCRIPTION OF THE INVENTION

Figure 1:
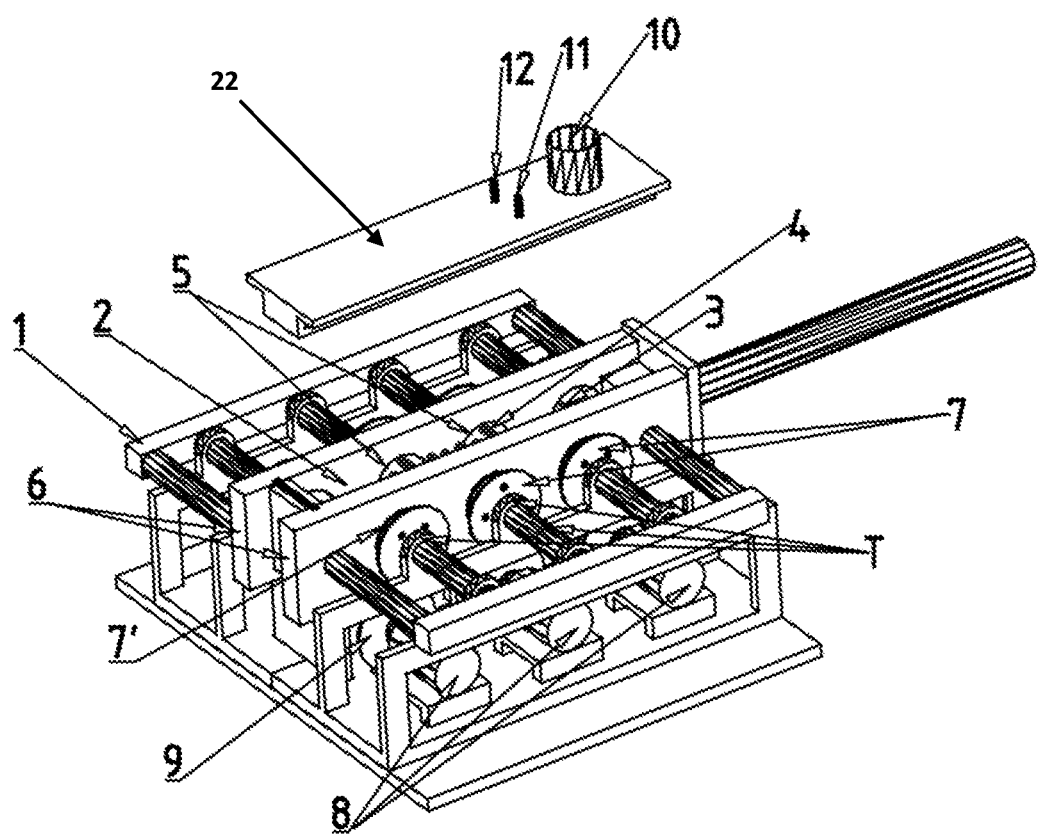
FIG. 1 shows a perspective view of a schematic representation of the mixing machine in an embodiment according to the present invention.

The present invention describes a mixing machine for mixing a dry homogeneous mixture with one or more components to obtain a viscous mixture. Through the presence of a self-cleaning system the mixing machine according to the present invention is particularly suited to the mixing of fast curing materials, such as composite materials to a polyester composition.

As already outlined above, the present invention describes a mixing machine for mixing a homogeneous mixture with one or more components to obtain a viscous mixture. This homogeneous mixture can be either a dry or a wet homogeneous mixture. In an embodiment, the homogeneous mixture contains granules of a certain material, such as wood; glass; pasta; or a thermo-hardening material such as: polyester, polyurethane, bakelite or rubber; or a thermoplastic material such as polypropylene, polyethylene, polystyrene; or glass or textile fibres. These granules can also come from all sorts of products from recycled materials such as wood, plastic, polyester, polyurethane, or bakelite. These granulate products can come from, for example, a polyester boat, a car bumper, an electrical fuse box made from bakelite, or the polyester sails of a windmill, but all other products from any material are possible. By granulating these materials followed by mixing the granules with various types of binding agents, such as water, cement, polyester resin, a hardener, and/or styrene a composite mixture can be produced using the mixing machine according to the present invention, that can be used for the production of all types of products, such as a plate, a floor tile, a manhole cover, a roof tile or wooden hardboard. In a special embodiment the mixing machine according to the present invention can be used for the production of various dough shapes, wherein flour, water and other possible components are mixed to obtain a viscous mixture. In another embodiment the mixing machine can be used for mixing and producing animal feed. Finally, the mixing machine can also be used for mixing paints, adhesives, concrete mixtures or other fluid components.

An additional advantage of the present mixing machine with self-cleaning system is that the mixing ratio between all the components such as coarse granules, fine granules and/or grit, can accommodate all possible values. Therefore the user is not limited in the mixing ratios of the homogeneous mixture with the binding components, contrary to other mixing machines.

The present invention e.g. in one embodiment uses a homogeneous mixture, e.g. a dry homogeneous mixture, that can include fibrous material with a length of 0-40 mm, granules of plastics particles, e.g. thermo-hardening plastics particles, with particle sizes of 0-15 mm and/or grit material from plastics particles, e.g. thermo-hardening plastics particles. The volume percentage of the fibrous material, the granulate and the grit material of this dry homogeneous mixture can be arbitrarily set between 0-80%. The dry homogeneous mixture should preferably have a humidity in balance with air that has a dew point of 25° C. at the most. The dry homogeneous mixture that is used in the present invention should preferably have a temperature of 50° C. at most, preferably 35° C. at most, with more preference for 25° C. at most, with even more preference for 18° C. at the most. If the temperature of the dry homogeneous mixture is too high, the binding agent for example will bind and cure faster, which is not desirable. On the other hand a temperature lower than ambient temperature can be desirable, using active cooling which thereby slows down the reaction, which can be necessary during the production procedure of certain products.

If necessary, the components of the dry mixture can be dried beforehand. Either all components of the dry homogeneous mixture can be dried together with a drying installation, or the drying of the components happens separately.

In an embodiment of the present invention the inlet for the dry homogeneous mixture is provided in the push zone (A) of the mixing chamber and preferably as close as possible to the top end of the mixing chamber (2). Thereby the diameter of the inlet is kept as large as possible compared to the inner diameter of the mixing chamber but still, at the most, equal to the inner diameter of the mixing chamber (2).

According to the present invention, in the mixing chamber, more specifically in the push zone and/or mixing zone of the mixing chamber, one or more components is added to the wet or dry homogeneous mixture to form a viscous mixture.

In an embodiment the mixing chamber (2) contains at least two inflow channels (11, 12) for adding one or more components to the homogeneous mixture, for example for the ingredients that are needed for a polyester or PU composition, which each contain respectively, at least one polyester resin and at least one hardener or one polyol and at least one isocyanate, and preferably the polyester resin or the polyol inserted through an inflow channel at the beginning of the mixing or push zone of the mixing chamber. The polyester resin or polyol itself generally reacts little or not at all to the components of the homogeneous mixture, so that very little or no scale forms in the location of this mixing, particularly for example no curing polyester or PU scale.

In a special embodiment of the present invention the mixing zone (B) of the mixing chamber (2) comprises at least one inflow channel for the hardener, such as the isocyanate, that is inserted downstream from the place where the polyester resin or polyol is inserted, as seen in the push direction. In the mixing zone (B) the inventors provide a certain amount of back mixing, by letting the rotors run with their mixing blades in the opposite direction so that the polyester resin or isocyanate and the hardener or polyol can easily spread over the whole mixing zone and mix sufficiently with the homogeneous mixture to obtain a homogeneous viscous composite mixture. In the push zone (A) the inventors provide preferably little or no back mixing, so that the homogeneous mixture that is already there will be moved mainly in the push direction towards the mixing zone of the mixing chamber. In the push zone (A) however mixing can already take place which causes the components of the inserted homogeneous mixture to remain in continuous movement and become mixed, and wherein this homogeneous mixture is pushed forward in the direction of the mixing zone (B).

In an embodiment of the present invention the homogeneous viscous composite mixture will primarily be formed in the mixing zone (B) within a certain timeframe with a certain viscosity so that it then can be pushed further to the discharge zone (C) and subsequently via the outlet mouth (18) and outlet valve (13) it can leave the mixing chamber, to be used for the production of products according to this invention.

The mixing chamber (2) and all matching parts in the mixing machine according to the present invention can take any dimension and shape. In an embodiment of the present invention the mixing chamber (2) contains a square tube with an internal side Z expressed in millimetres, which lies preferably within a 200-300 mm range. The inventors have found that the form of a square tube is particularly suited to allowing the internal cleaning system to work according to the present invention, but another shape, for example oval, is not excluded.

In an embodiment of the mixing chamber with a metal square tube, the internal side Z measures over the whole length of the tube (Z+0.1) mm and it is more preferably finished to a tolerance on the side Z of ±0.05 mm at most, preferably ±0.02 mm at most, this is valid for the internal height and for the internal width of the mixing chamber over its total length.

During the mixing procedure the outlet valve (13) in an embodiment of the present invention, is pressed against the outlet mouth (18) of the mixing chamber (2), against the push pressure of the mixture. This will also ensure that all components of the viscous mixture can be kept in the mixing chamber for the time needed to obtain the required mixture. The outlet valve (13) is pressed against the exhaust tube (18) of the mixing chamber (2) with a determined and preferably adjustable force. This force can be delivered by a spring, for example a metal spring, such as a leaf spring or a spiral spring. However, the inventors have discovered that a spring, in particular a spiral spring, can easily become soiled which influences its spring force. The inventors have therefore chosen to use gravitational force instead of spring force, for example by using the weight of the outlet valve (13) as a counterweight. The outlet valve, by rotating around its hinge, will exert pressure against the outlet mouth (18) with a force that can be regulated using the weight of the outlet valve (13) which means that the time for opening the outlet valve (13) can be determined in combination with the push pressure that the mixture exercises upon the outlet valve in order to open it.

In an embodiment of the present invention, the portion of the push zone (A) in the mixing chamber is equipped with at least one and preferably two rotating rotors (5). Of these, there is preferably one rotor on the left and one rotor on the right, attached to the side walls of the mixing chamber (2), such that they are able to move in each other's push area with their push blades or not. These rotors (5) can be calibrated with an adjustable rpm and rotation direction, and are equipped with funnel-shaped crossover channels in which their push blades can move axially. These push blades are, via these funnel-shaped interconnecting channels, suspended horizontally and rotating in the push zone of the mixing chamber, mainly suited to pushing, and providing additional mixing to the entire content of the push zone downstream in the direction of the mixing zone.

In another embodiment the mixing zone (B) is equipped with one rotor and preferably with two rotors and even more preferably with three rotating rotors of which the middle rotor is attached on the left and the two outer rotors are attached on the right (or the other way around) of the side walls of the mixing chamber. These rotors (5) are attached in such a way that their mixing blades can move or not in each other's mixing field, with adjustable rpm and rotation direction, and are equipped with funnel-shaped interconnecting channels in which their mixing blades can move axially. These mixing blades are, via these funnel-shaped interconnecting channels, suspended horizontally and rotating in the mixing zone (B) of the mixing chamber (2), mainly suited to mixing, back mixing, and providing additional pushing to the entire content of the mixing zone downstream in the direction of the discharge zone (C). If the mixing zone (B) is equipped with three rotating rotors, the middle rotor will rotate in the opposite direction. In order to achieve this opposite rotation direction, this middle rotor will have an additional gear between the rotor disc (7') and the gear disc (7).

As an alternative, all rotors (5) of the mixing zone (B) can each be driven by an independent motor (8), each with an adaptedly adjustable rpm to be defined and the required rotation direction, e.g. using a frequency controller. In this way an even better and faster mixing of all components can be achieved. It is necessary to note here that the mixing blades can no longer rotate in each other's rotation field because this could cause damage or breakage to the mixing blades.

Between the rotating rotors that pass through the side walls via their bearings and are attached to the inner side of the side walls of the mixing chamber, there is often a tolerance that should be kept as small as possible in order to avoid any infiltration of the mixture by components such as dust and fluids. After infiltration these components could land in the bearings through which the rotors pass. This tolerance between the rotating rotors and the inside of the side walls can be reduced to 0 mm by inserting special sealing rings between the rotating rotors and their transit channel in the side walls of the mixing chamber. These sealing rings can be made from various materials, such as Viton® or Teflon® etc.

This is also the case between the push blades and mixing blades and their transit channels in their matching rotors. A sealing ring made of Viton® or Teflon® can also be used for this, or even a special metal seal can be inserted which can reduce the tolerance to 0 mm to prevent the infiltration of components such as dust or fluids from the mixing material through the transit channels into the rotors, by the sliding in and out of the push and mixing blades during the cleaning process.

This seal is then easy to replace and prevents the wear of the rotors and their transit channels and also prevents the damage to the side walls of the mixing chamber where the rotors run through and rotate.

The discharge zone (C) is equipped with at least one rotor and preferably with two rotating rotors of which one rotor is attached to the left and one rotor is attached to the right in the side walls of the mixing chamber, such that with their push blades they can, or not, move in each other's discharge field, with an adjustable rpm and rotation direction, and equipped with funnel-shaped transit channels in which their push blades can move axially. These push blades are suspended horizontally and rotating via these funnel-shaped transit channels in the discharge zone of the mixing chamber, and mainly suited to pushing, and providing additional mixing to the entire content of the discharge zone downstream in the direction of the outlet mouth and outlet valve. This outlet valve (13) will in turn be opened by the push pressure that is exerted on the homogeneous mixture by the mixing and push blades in the different zones of the mixing chamber. In this way the mixture is pushed out of the mixing chamber and subsequently collected to be processed in the production of objects manufactured with this homogeneous viscous mixture.

In an embodiment of the present invention the push and mixing blades (3, 4) can take various shapes within the different zones of the mixing chamber (2), such as round, square, rectangular, elliptical, polygonal, etc. In all three zones, the rotors can be fitted with one or more of the above-mentioned shapes of push and mixing blades or a combination of all these shapes, on the condition that they can move axially in the rotors via the matching funnel-shaped transit channels and can be eliminated from the mixing chamber, so that the cleaning system can start after a mixing cycle.

The mixing machine according to the present invention is particularly suited to the mixing of a dry homogeneous mixture with one or more components of for example a polyester composition to obtain a rapidly curing viscous composite mixture. It is generally described in the specialised literature and clear for the expert with which metals, with a smooth surface, a curing mixture such as polyurethane shows no significant adhesion. It is very simple to establish experimentally whether a metal conforms to these conditions and would therefore be suitable to achieve the demonstrated beneficial effects of the present invention. In an embodiment of the present invention all push and mixing blades of the rotors are produced preferably from a hard polished kind of metal, preferably produced from a very hard polished kind of steel, and more preferably from tempered, polished or chromed steel. The inventors have found that such construction materials offer the advantage that during the throughput of the composite mixture during the mixing process in the mixing chamber, especially if fibreglass and grit are used, as well as during the mechanical cleaning of the push and mixing blades, they are little or not prone to wear and tear. This is important because during the mixing process, wear and tear would notably occur on the rims and on the extremities of the rotor blades, which would increase the tolerance between the rims and the extremities of the rotor blades with the inner wall of the mixing chamber (2). Too much tolerance between these two would allow part of the mixture to find its way to the outlet of the mixing chamber without being sufficiently mixed with all the ingredients.

In an embodiment of the present invention, the rotors (5) in the push, mixing and discharge zones of the mixing chamber are suspended in both side walls of the mixing chamber (2) with different speeds and matching rotation directions by means of ball or needle bearings, preferably by means of closed ball or needle bearings. The rotors are equipped with suitable funnel-shaped transit channels (30) for inserting the in and out sliding mixing and push blades (3, 4) which are inserted horizontally via these funnel-shaped transit channels (30) into the mixing chamber (2). The rim tolerance between push and mixing blades and the contact surfaces of their matching funnel-shaped transit channels in the rotors is preferably 0.1 mm and more preferably 0.05 mm and even more preferably 0.02 mm.

In an embodiment of the present invention the rotor blades that are inserted via the funnel-shaped transit channels (30) of the different rotors (5) into the mixing chamber (2), are attached to rotating discs on one extremity outside the mixing chamber, in this invention called, 'rotor discs' (7'). These rotor discs are attached to gear discs (7) to be driven by one or preferably more underlying motors with driving mechanism and matching gears, chains, and/or gear belts that attach to the gear discs (7) that are attached to the rotor discs (7') to which the rotor blades are attached. In this way the rotors are driven with an adapted rpm and rotation direction. If the mixing zone (B) is equipped with three rotating rotors, the middle rotor will rotate in the opposite direction. In order to achieve this opposite rotation direction, this middle rotor will have an additional gear between the rotor disc (7') and the gear disc (7).

In another embodiment of the present invention all rotors (5) found together in the mixing chamber (2) can each be driven independently by a motor (8) with an adjustable speed and rotation direction. This setting can be done both mechanically and by using a frequency lock. In this embodiment the rotors (5) can be attached with ball bearings in the side walls (6) of the mixing chamber (2) and are driven by the push and/or mixing blades (3, 4), where these push and/or mixing blades (3, 4) are attached to rotor discs (7'). These rotor discs (7') are then directly driven by drive motors (8). This ensures fewer parts, less wear on the parts, and avoids breakage of the parts. In addition, there is less maintenance work needed on the mixing machine. It is important to note that in this embodiment, if all rotors (5) with their matching mixing and push blades (3 and 4) are each driven independently by a motor (8) with adjusted rpm and rotation direction, it will no longer be possible for the mixing and push blades (3 and 4) of the different rotors (5) to rotate in each other's rotation field in the mixing chamber (2), due to the possibility that they could block each other and cause damage and breakage to the parts of the mixing machine.

Preferably the maximum radius R of the rim that the push and mixing blades of the rotors cover within the mixing chamber is equal to half the height H of the mixing chamber minus the maximum diameter of the granulate of the mixture, e.g. R=H/2-15 mm; preferably R=H/2-8 mm. By preference the maximum length L of the push and mixing blades within the mixing chamber is equal to the breadth B of the mixing chamber minus the maximum diameter of the granulate of the mixture, e.g. L=B-15 mm; preferably L=B-1-8 mm. The inventors have found that by doing this, wear is inhibited that can take place on the surface parts of the push and mixing blades of the rotors and on the interior walls of the mixing chamber. This wear occurs through friction of the mixture flying around between the push and mixing blades of the rotors and the interior walls of the mixing chamber during the mixing process.

In an embodiment of the present invention the push blades and mixing blades can slide axially in and out via the funnel-shaped transit channels in their matching rotors over a length that is minimally equal to the total length of the push and mixing blades, to eliminate them completely from the mixing chamber so that the mixing chamber can be completely empty. This is necessary to allow the cleaning plate (16) to move axially downstream from the top end of the mixing chamber (2) over the whole length of the mixing chamber in the direction of the outlet mouth (18).

The tolerance between the diameters of the push and mixing blades (3, 4) and their respective funnel-shaped transit channels (30) in their matching rotors is kept as small as possible. This tolerance should preferably be 0.05 mm and more preferably 0.02 mm. The aim is to allow the funnel-shaped transit channel to function as a scraping knife and to scrape off all the scale that is left on the rims and surfaces of the push and mixing blades after their axial sliding movement, and to leave this scale behind in the mixing chamber. The transit channel also has a sort of funnel shape wherein the friction surface between the push and mixing blades and the contact surface of the transit channel is kept as small as possible, to avoid wear and tear of both parts as much as possible and to allow the axial movement of the push and mixing blades in the funnel-shaped transit channels to run smoothly. The funnel-shaped transit channel can also be made from a special hard metal insert in the rotor, so that in the case of wear and tear, only the insert needs to be replaced in the rotor, and not the whole rotor.

In an embodiment the tolerance between the rim of the cleaning plate (16) and the inner rim of the mixing chamber is 1 mm and preferably 0.5 mm and even more preferably 0.1 mm. The inventors have discovered that the precise fit of the rim of the cleaning plate (16) to the inner rim of the mixing chamber offers the advantage that there is no or very little remaining mixture that can stay in the mixing chamber after the cleaning operation has been performed by the cleaning plate.

According to the present invention, the cleaning cycle that occurs after every mixing cycle that takes place in the mixing chamber, starts with sliding the push and mixing blades (3, 4) out of the mixing chamber (2) via their matching funnel-shaped transit channels (30) in the rotors (5) such that all remaining scale of the composite mixture is removed and the mixing chamber is free for the movement of the cleaning plate (16). The cleaning plate will move axially downstream over the entire length of the mixing chamber from the top end to the outlet mouth (18) at the end of the discharge zone (C). In this manner all remaining particles of the composite mixture are removed from the mixing chamber via the outlet mouth. The complete inner surface of the mixing chamber and all the moving parts in the mixing chamber are cleaned in this manner and are stripped of all remaining particles of the composite mixture after a mixing cycle. In this manner the mixing chamber remains continuously operational and free from contamination of the curing composite mixture.

In an embodiment of the present invention, the cleaning plate (16) is made of a hard type of metal, preferably a hard polished type of metal wherein less wear will occur during the cleaning cycle at the outer perimeter of the cleaning plate and also less scale will be formed on the cleaning surface of the cleaning plate.

In an embodiment of the present invention the cleaning surface of the cleaning plate is preferably at an angle of +/−75° to the bottom of the mixing chamber. This will better spread the cleaning pressure over the cleaning surface of the cleaning plate, and prevent a jarring movement of the cleaning plate during the cleaning cycle.

In an embodiment of the present invention the cleaning process ensures the axial sliding out of the push and mixing blades from the mixing chamber via the funnel-shaped transit channels in their rotors and the axial movement of the cleaning plate over the entire length of the mixing chamber. Both axial sliding movements occur via hydraulic cylinders driven by a hydraulic unit. In an embodiment of the present invention the hydraulic unit that drives the hydraulic cylinders of the cleaning system, is equipped with a nitrogen battery that can continue to drive the hydraulic cylinders of the cleaning system in the case of unexpected failure of the hydraulic unit due to power loss or a technical defect. As a consequence the operation of the cleaning system is not jeopardised and the machine cannot get dirty and jam.

In another embodiment the axial sliding out of the push and mixing blades from the mixing chamber happens via funnel-shaped transit channels in their rotors and the axial movement of the cleaning plate through the entire length of the mixing chamber by using compressed air cylinders or via a mechanical construction that is driven with a motor or by hand, such as a worm gear.

In an embodiment of the present invention during the cleaning cycle the cleaning plate will be pushed downstream in the direction of the outlet mouth until the outlet valve automatically opens over an opening angle of +/−135°. Wherein the surfaces of the outlet valve and the cleaning plate that are in contact with the composite mixture during the mixing cycle, can be cleaned by a machine operator or potentially automatically. After cleaning these surfaces the cleaning plate is repositioned at the starting position in the mixing chamber and the outlet valve will automatically close the mixing chamber. Subsequently the push and mixing blades can be inserted back to their correct position in the mixing chamber via their matching funnel-shaped transit channels in the rotors and the mixing chamber is ready to start a new mixing cycle with the mixing machine.

In an embodiment of the present invention at the left and right of the mixing chamber tube all parts are assembled and mounted together on a foot plate, including the rotor blades (3, 4) and the corresponding connected rotor discs (7') and gear discs (7) that are driven by an underlying mechanism, together with all parts necessary for pulling the push and mixing blades jointly out of the mixing chamber, the assembly is called 'units' in this invention. These units are slidable horizontally, mechanically or manually via guides on an underlying bottom plate with the help of hydraulic cylinders or compressed air cylinders. This allows the removal of the push and mixing blades (3, 4) together left and right of the mixing chamber out of the mixing chamber, so that the cleaning movement can take place by using the cleaning plate.

In an embodiment according to the present invention the removal and replacement of the push blades and mixing blades can take place in a very simple manner from the inner space of the mixing chamber. This replacement happens by first detaching the side walls of the mixing chamber from the body of the mixing chamber, so that they can slide backwards together with the units via the guides in the bottom plate. This will provide sufficient free work space in the mixing chamber for this maintenance work, while having to dismantle few or no other parts of these units.

In an embodiment of this working method, according to the present invention, the time spent by the ingredients in the mixing chamber for the thermal curing composition, for instance polyester, is lower than the time that the components for the polyester composition need to start their curing. The time spent is preferably within the range of 5 seconds to 3 minutes, more preferably at least 10 seconds, even more preferably at least 20 seconds, potentially 3 minutes at most, preferably 2 minutes at most, more preferably 1 minute at most, even more preferably 45 seconds at most, still more preferably 35 seconds at most and most preferably 30 seconds at most. The speed of the curing of the thermal curing mixture for instance polyester mixture or for instance polyurethane mixture can be adjusted in the mixing chamber with appropriate reaction accelerators, also called catalysts, and/or reaction retardants, also called inhibitors. The inventors have found that the above mentioned time spent in the range of 10-30 seconds requires little or no such additives to obtain a suitable mixture, and it is sufficiently low at the same time to avoid excessive heating of the mixing composite mixture.

According to the present invention, the mixing machine and all its matching parts can have any possible dimension wherein the flow rate of the viscous homogeneous mixture that can be pushed through the mixing chamber also has a diverse range. As an example, a mixing chamber with an internal side Z of 225 mm, will be able to provide a maximum flow rate to the viscous homogeneous mixture of between 1500 to 2000 litres per hour. With a greater flow rate and the same dimension of the mixing chamber the viscous mixture that is formed in the mixing chamber will increase its temperature with the result that the thermal curing composition will cure faster. There is a risk that the viscous mixture will become too viscous downstream for further processing.

The various work methods according to the present invention are preferably part of a more elaborate work method. In an embodiment according to the present invention, the work method includes the forming of an object by curing a quantity of viscous homogeneous mixture that is inserted into a mould or a matrix. This matrix is preferably closed at a temperature of 15-60° C. and may or may not be subject to a certain curing pressure during a specific timeframe. Hereby the fill volume of the mould or matrix is determined by the volume of the finished product, whether or not increased with the volume of mixture that is required to compress the fill volume under a certain pressure to obtain the volume of the finished product that is formed in the matrix when this is completely closed.

In an embodiment of the present invention, the used granules contain solids such as wood snippets, grit, sand, gravel, plastics particles, flour, etc. The inventors have discovered that extremely useful objects can be manufactured with rough to very smooth surfaces using this work method. In another embodiment, the object created is selected from a list of potential products, for instance a concrete beam, a manhole cover, a grid, a livestock shed, a clinker, a roof tile, a loaf of bread, etc.

In yet another embodiment of the present invention, the granules used contain solid wood chip particles. The inventors have discovered that extremely useful objects can be manufactured with rough to very smooth surfaces using this work method. In another embodiment, the object created is selected from a list of potential products, for instance wood particle board, fibreboard, wood beam profile, etc. that all meet the pre-established dimensions.

The invention is now further illustrated in the following drawings:

FIG. 1 shows what the mixing machine (1), according to the present invention, could schematically look like in a certain embodiment. The mixing machine (1) comprises a mixing chamber (2) with push and mixing blades (3 and 4) 'also called rotor blades', which are suspended horizontally using rotors (5) via rotor transit channels in both side walls (6) of the mixing chamber (2). The rotors (5) are attached with ball bearings in the side walls (6) and are driven by rotor discs (7') which are in turn connected to gear discs (7). These are driven by gears (9) via transmissions (T) including axles and bearings, and motors (8). In this embodiment the mixing chamber (2) comprises three inflow channels, the dry homogeneous mixture of the solid components is fed via inflow channel (10), and then at least one component, such as polyester resin or polyol is loaded via inflow channel (11) and at least one other component, such as polyester hardener or polyisocyanate is loaded via inflow channel (12).

Figure 2:
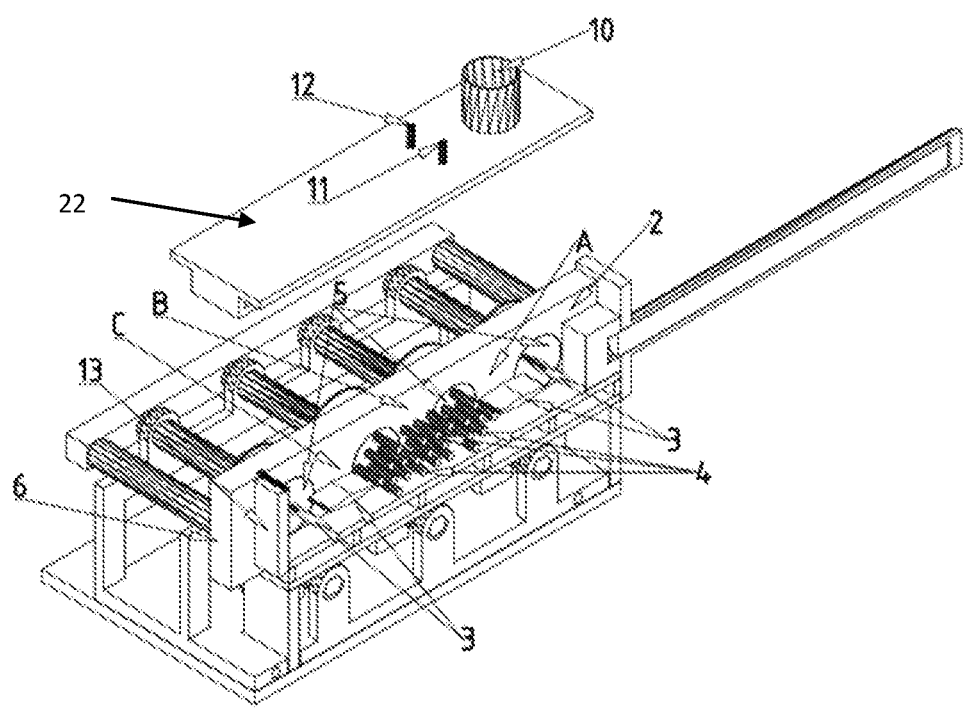
FIG. 2 shows a perspective view of a section of the mixing chamber with three different zones and their matching rotors with their respective parts such as push and mixing blades such as those that can be present in the mixing chamber, in an embodiment according to the present invention.

FIG. 2 shows in a section how a mixing chamber (2) is divided into three different zones. The push zone (A) comprises an inflow channel (10) for the homogeneous mixture, and in the sketched embodiment two rotating rotors (5) are present, of which one rotor is suspended in the left side wall (6) of the mixing chamber (2) and one rotor is suspended in the right side wall (6) of the mixing chamber (2), each equipped with push blades (3) which rotate in each other's push area and which will mainly push through the dry homogeneous mixture that is loaded in the inflow channel (10) and additionally mix with the help of the push blades (3) towards the mixing zone (B). Mixing zone (B) which in turn is equipped with two inflow channels (11) and (12) for example polyester resin and its hardener or polyol and isocyanate, and wherein, in the sketched embodiment, three rotors (5) rotate of which for instance one is suspended in the right side wall (6) and two are suspended in the left side wall (6) of the mixing chamber (2).

These rotors (5) are equipped with mixing blades (4) which rotate in each other's mixing field with specific rpm and rotation directions. In this embodiment, the middle rotor (5) of the three rotors (5) rotates in the opposite direction to the two other rotors (5). Hereby an additional gear is to be placed between the rotor disc (7') and the gear disc (7). This creates a back mixing that will mix the homogeneous mixture in the mixing zone (B) even better with the added components such as the polyester resin and its hardener or the polyol and isocyanate, to a viscous homogeneous composite mixture. Afterwards the mixture will be pushed forward to the discharge zone (C). In discharge zone (C) two rotors (5) rotate of which, in the sketched embodiment, one rotor (5) is suspended in the left side wall (6) and one rotor (5) is suspended in the right side wall (6) of the mixing chamber (2), each one equipped with push blades (3) that rotate in each other's discharge zone and that will eject the viscous mixture out of the mixing chamber (2) via the outlet valve (13). Next the viscous mixture will be collected to transfer it to the moulds or matrices, to obtain products formed with this viscous homogeneous mixture that comply with specific predetermined standards.

At the start of the mixing process of the mixing machine a quantity of the homogeneous mixture will be loaded first via the inflow channel (10) into the push zone (A). This homogeneous mixture is preferably at a temperature of maximum 40° C., at the highest 35° C., better at room temperature (thus almost 18° C. in winter, to 30° C. in summer). The temperature and the humidity of the mixture can be adjusted if the homogeneous mixture is dried locally.

After loading a quantity of homogeneous mixture into the push zone (A) of the mixing chamber (2) (e.g. almost 20 kg/min.) it is pushed forward by the push blades (3) to the mixing zone (B). In mixing zone (B) a quantity of polyester resin or polyol (e.g. almost 1 kg/min.) is loaded via the inflow channel (11) and for example a quantity of hardener or isocyanate (e.g. almost 1 kg/min.), is loaded via the inflow channel (12), together this is 10 percent of the dry homogeneous mixture by weight), as a binding agent in the mixing zone (B). This polyester resin and its hardener or the polyol and isocyanate will be distributed as uniformly as possible and mixed by the mixing blades (4) during a predetermined certain time (e.g. about 10-30 seconds) to form a viscous homogeneous mixture. Next this mixture is pushed forward to the discharge zone (C) of the mixing chamber (2), where the mixture continues to be mixed and will be pushed forward by the rotating push blades (3) to the outlet valve (13) of the mixing chamber (2), and will subsequently leave the mixing chamber (2) via the outlet valve (13) after which the mixture will be collected and transferred to a mould or a matrix.

The inventors also discovered that via additional inflow channels in the push zone (A) and mixing zone (B) of mixing chamber (2) similar components or other additional additives can be added to the mixture e.g. dye, fibres, etc.

The mixing machine is preferably built in such a manner that after a predetermined certain mixing time enough pressure on the mixture is built up in the mixing chamber (2) using the rotating push and mixing blades (3 and 4) so that the outlet valve (13) will open, and the viscous homogeneous mixture with leave the mixing chamber (2) via the outlet valve (13), and will be collected and transferred to a mould or a matrix. The counter pressure of the outlet valve (13) is for instance exerted using a spring, but preferably through gravity using a fixed or movable counterweight attached to the outlet valve (13). This counter pressure will also contribute to determining the mixing time that the mixture must remain predominantly in the mixing zone (B).

It appears that about 1 to 5 kg of viscous mixture can remain in de mixing chamber (2) after a mixing cycle, in particular against the interior walls of the mixing chamber (2), and on the push blades (3) and mixing blades (4), which will cure inside the mixing chamber (2) when the machine is shut down. To prevent the mixing chamber (2) from becoming clogged over time, the interior walls of the mixing chamber (2), the push blades (3) and mixing blades (4) are cleaned immediately after each mixing cycle by using the built-in cleaning system (16, 17).

Figure 3:
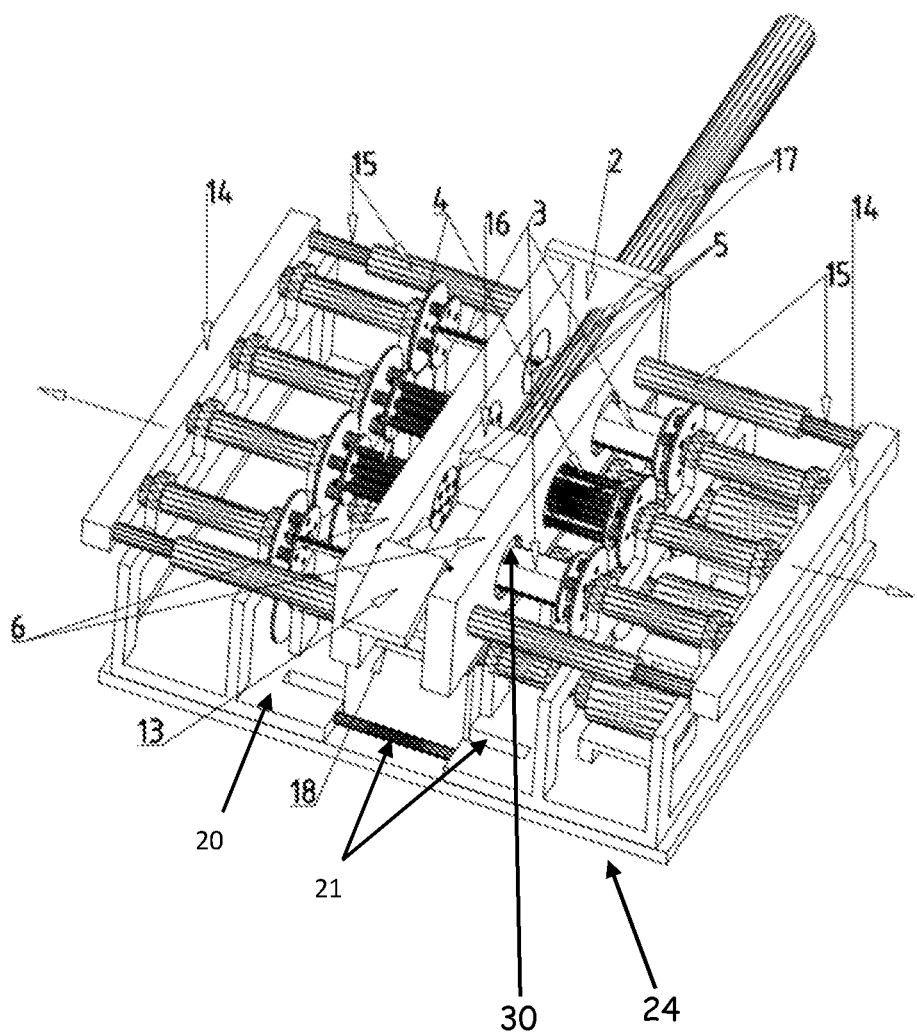
FIG. 3 shows a perspective view of how, in an embodiment according to the present invention, the built-in cleaning system starts working to eliminate all scale from the viscous composite mixture from the moving parts in the mixing chamber and the interior walls of the mixing chamber.

FIG. 3 shows how the cleaning system (16, 17) works. First of all the push blades (3) and mixing blades (4) on both sides of the machine are all removed at the same time from the mixing chamber (2) using the hydraulic or compressed air cylinders (15) and bearers (14), which push these push and mixing blades via the funnel-shaped transit channels through the rotors (5) from their starting position towards the back until they are completely removed from the mixing chamber (2) up to the same level as the interior of the side walls (6) of the mixing chamber (2). As the push and mixing blades are very accurately and appropriately guided through the funnel-shaped transit channels of the rotors (5) all scale of the viscous mixture that is present on the rims and surfaces of these push and rotor blades (3 and 4) will be removed by this movement and stay in the mixing chamber (2). Afterwards the cleaning plate (16), which precisely and adequately slides through the inner rim of the mixing chamber (2), will move using a hydraulic or compressed air cylinder (17) which will push the cleaning plate (16) axially downstream from its starting position over the entire length of the mixing chamber (2) in the direction of the outlet mouth (18) and the outlet valve (13). The cleaning plate (16) shall take all leftover remnants of the viscous homogeneous mixture that is in the mixing chamber (2) and carry them to the outlet mouth (18) of the mixing chamber (2). The cleaning plate (16) shall subsequently push the outlet valve (13) open, and will push the leftover remnants out of the mixing chamber (2) after which they will fall into a tray and be processed further. Afterwards the cleaning plate (16) is brought back to its starting position using the hydraulic or compressed air cylinder (17), which causes the outlet valve (13) to close automatically because of its counterweight against the outlet mouth (18) of the mixing chamber (2). Then the push and mixing blades (3 and 4) are moved back to their starting position in the mixing chamber (2) via their funnel-shaped transit channels through the rotors (5) using hydraulic or compressed air cylinders (15) and the mixing chamber (2) is ready to start a new mixing cycle with the mixing machine.

Figure 4:
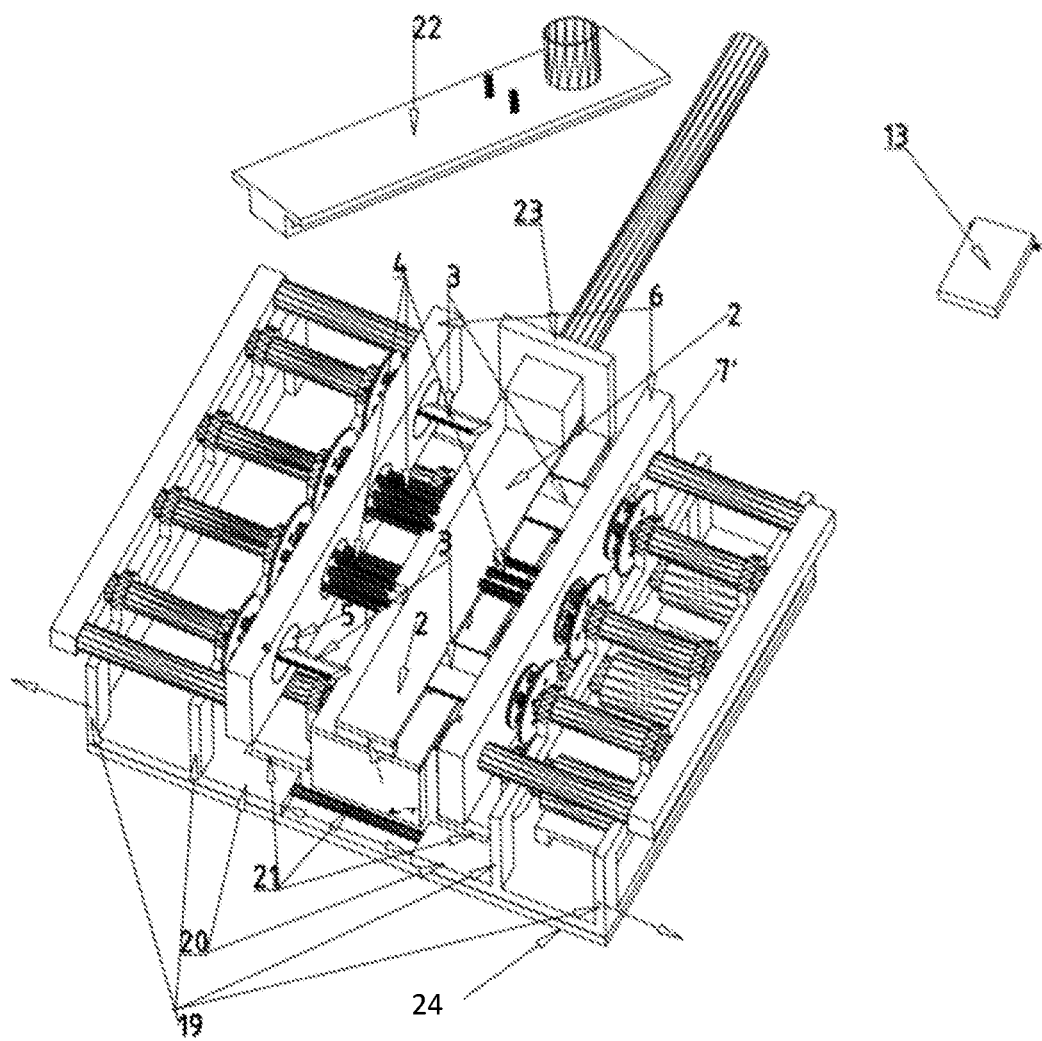
FIG. 4 shows a perspective view of how, in an embodiment according to the present invention, the removal and replacement of the push blades and mixing blades can take place in a very simple manner.

FIG. 4 shows the mixing machine in a position where the push and mixing blades (3 and 4) can easily and quickly be dismantled and replaced. This position is reached by first loosening then removing the top plate (22) of the mixing chamber (2). Then the outlet valve (13) is removed. Next the side walls (6) are detached from the bottom plate (24) of the mixing chamber (2) and from the head plate (23) at the main end of the mixing chamber (2). Then the complete units (19), which are mounted on movable foot plates (20), including the side walls (6), are moved backwards via their guided rods and recesses over the underlying bottom plate (22) as far as possible until there is sufficient work room in the mixing chamber (2). This movement can take place using hydraulic cylinders or compressed air cylinders (not sketched) or mechanically or manually. Then the push blades (3) and mixing blades (4) are dismantled by disconnecting them from their rotor discs (7') and removing them from the rotors (5) via their funnel-shaped transit channels in the direction of the mixing chamber (2) and replacing them by new or reconditioned units. This method allows the replacement of the push and mixing blades (3 and 4) without having to dismantle any other parts, or as few as possible, of the units (19). This position also offers the advantage of potentially being able to dismantle other parts of the machine, if necessary, in an easy and simple manner. E.g. the bottom plate (24) of the mixing chamber (2).

Figure 5:
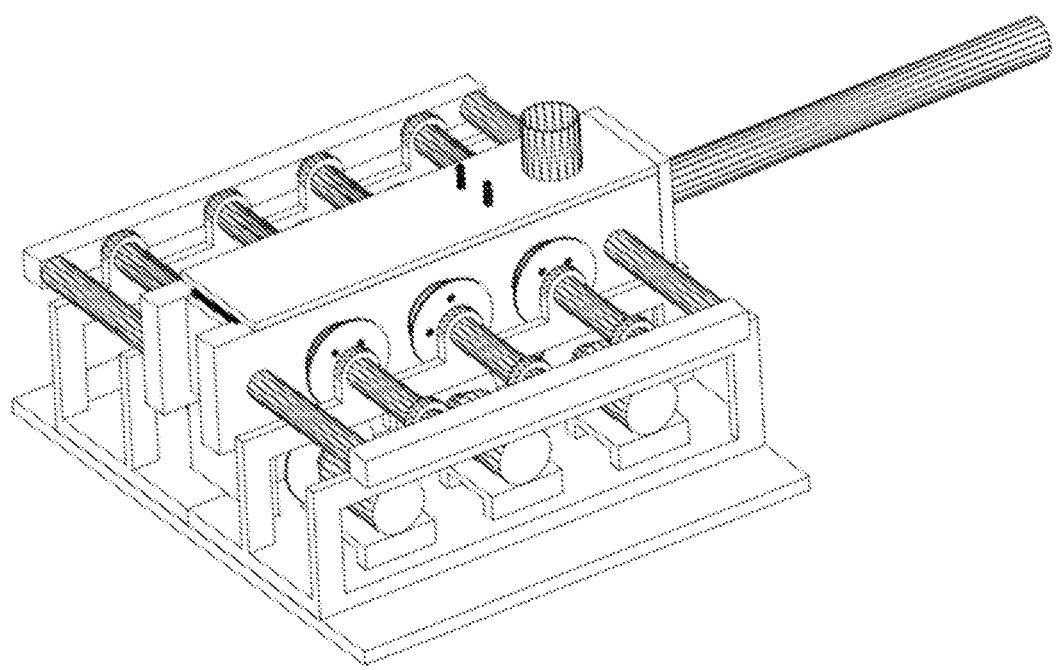
FIG. 5 shows a perspective view of the mixing machine according to the present invention.

FIG. 5 shows a perspective view of a mixing machine as described in this invention.

Figure 6:
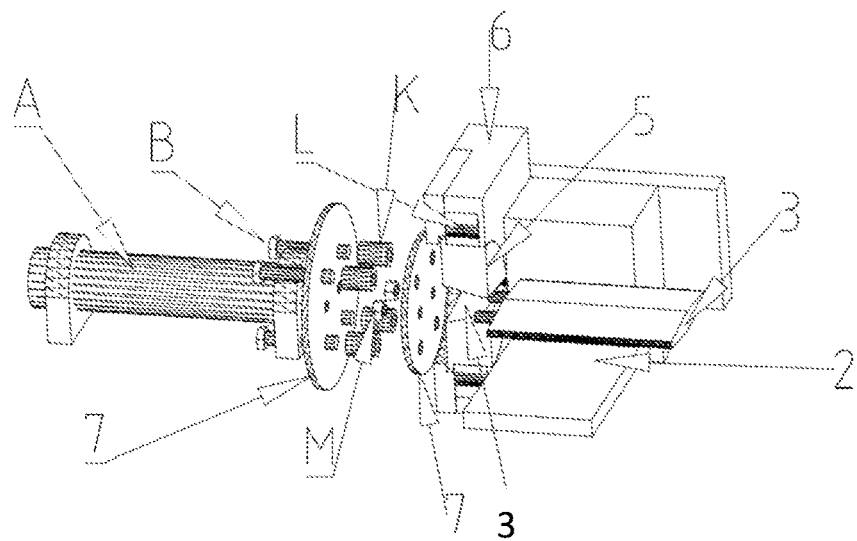
FIG. 6 shows a perspective view of a section of a part of the mixing chamber with a rotor in the side wall with its funnel-shaped transit channel, with the matching push blade and the rotor disc to which the push blade is attached with the connected gear disc and drive shaft.

FIG. 6 shows a perspective view of a rotor (5) suspended in a side wall (6) using a bearing (L) with its transit channel (30). The matching push blade (5) of the rotor (5) is transferred and pushed forward through the transit channel (D), that is funnel-shaped with a very small rim tolerance between the contact surfaces of the funnel and those of the push blade, for example 0.02 mm. Next the push blade (3) is attached to the rotor disc (7') preferably by its protruding screw bolts, using nuts (M). The rotor disc (7') is coupled using fittings (K) and bolts (B) to the gear disc (7) which is driven by an underlying driving mechanism of which the rotating axis (A) is a part that will rotate the rotor (5), together with its matching push blade (3) at a desired rpm and rotation direction in the appropriate zone of the mixing chamber (2). The parts (A, B, K, M, 7, 7' and 3) together form a linked entity that together with its base is slidable as one unit axially relative to the rotor (5). In this way the push blade (3) can be eliminated from the mixing chamber (2) via its funnel-shaped transit channel (30) and the scale of the PU can be scraped off the push blade (3) and left in the mixing chamber (2). The funnel-shaped transit channel (30) offers the advantage that if more scale is still carried through with the push blade (3) on extraction of the push blade (3) from the mixing chamber (2), this scale can easily be eliminated from the conic shape of the transit channel.

Figure 7:
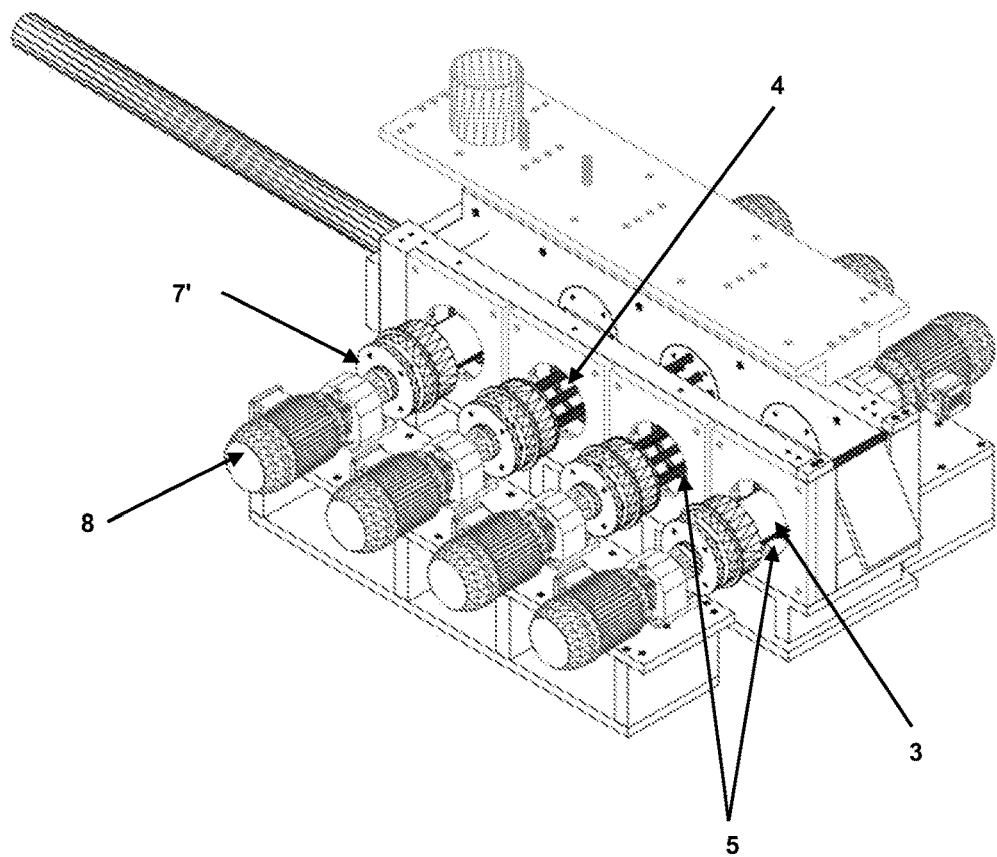
FIG. 7 shows a perspective view of a specific embodiment of the mixing machine according to the present invention, wherein on both sides all rotors with their matching mixing and push blades each separately are directly driven by a driving mechanism, more specifically a matching motor with adjustable rpm and rotation direction.

FIG. 7 shows a perspective view of a specific embodiment of the mixing machine according to the present invention, wherein on both sides all rotors (5) with their matching mixing and push blades (3 and 4) each separately are directly driven by a driving mechanism, more specifically a motor (8) with adjustable rpm and rotation direction.

The invention claimed is:

1. A mixing machine for the mixing of a homogeneous mixture with one or more components to obtain a viscous mixture,
   the mixing machine comprising a mixing chamber which is divided into a push zone (A), a mixing zone (B), and a discharge zone (C), wherein the mixing chamber comprises:
   multiple walls consisting of one or more top plates with multiple inflow channels, one or more bottom plates, and multiple side walls;
   an outlet mouth;
   an outlet valve;
   in and out sliding push blades, in and out sliding mixing blades, or both;
   several rotors integrated in the side walls of the mixing chamber, where the rotors are equipped with transit channels for the in and out sliding push and in and out sliding mixing blades; and
   a self-cleaning system comprising a cleaning plate and a self-cleaning system driving mechanism, where the cleaning plate can move longitudinally through the mixing chamber.

2. The mixing machine according to claim 1, wherein the in and out sliding push blades, the in and out sliding mixing blades, or both are attached to a blade driving mechanism at one extremity outside the mixing chamber.

3. The mixing machine according to claim 2, wherein the blade driving mechanism of the in and out sliding push blades and the in and out sliding mixing blades includes rotors and rotor discs, wherein the rotor discs in turn are connected to gear discs, which are driven by gears via transmissions.

4. The mixing machine according to claim 2, wherein the blade driving mechanism of the in and out sliding push blades and the in and out sliding mixing blades comprises rotors and rotor discs wherein the rotor discs in turn are directly connected to drive motors.

5. The mixing machine according to claim 3, wherein the blade driving mechanism of the in and out sliding push blades and the in and out sliding mixing blades comprises hydraulic cylinders, compressed air cylinders, or a mechanical construction that can be driven by a motor or manually to achieve the in and out sliding of the push and mixing blades through the transit channels in the mixing chamber.

6. The mixing machine according to claim 4, wherein the blade driving mechanism of the in and out sliding push blades and the in and out sliding mixing blades comprises hydraulic cylinders, compressed air cylinders, or a mechanical construction that can be driven by a motor or manually to achieve the in and out sliding of the push and mixing blades through the transit channels in the mixing chamber.

7. The mixing machine according to claim 2, wherein the blade driving mechanism of the in and out sliding push blades and the in and out sliding mixing blades positioned left and right of the mixing chamber is mounted respectively on a left movable foot plate and a right movable foot plate.

8. The mixing machine according to claim 7 wherein the left movable foot plate and the right movable foot plate are slidable and connected with each other via guides on the underlying bottom plate.

9. The mixing machine according to claim 1 wherein the transit channels for the in and out sliding push blades, the in and out sliding mixing blades, or both are funnel-shaped.

10. The mixing machine according to claim 1 wherein one or more top plates at the level of the push zone (A) are equipped with an inflow channel for a dry mixture.

11. The mixing machine according to claim 1 wherein one or more top plates at the level of the mixing zone (B) are equipped with two or more inflow channels configured for adding one or more components.

12. The mixing machine according to claim 1 wherein in each push zone, mixing zone, and discharge zone the rotors are present with matching in and out sliding push blades and in and out sliding mixing blades.

13. The mixing machine according to claim 12, wherein the mixing chamber at the level of the push zone (A) comprises one or more of the rotors which comprise one or more of the in and out sliding push blades.

14. The mixing machine according to claim 12, wherein the mixing chamber at the level of the mixing zone (B) comprises two or more of the rotors which comprise one or more of the in and out sliding mixing blades.

15. The mixing machine according to claim 12, wherein the mixing chamber at the level of the discharge zone (C) comprises one or more of the rotors which comprise one or more of the in and out sliding push blades.

16. The mixing machine according to claim 1, wherein the cleaning plate has a rim that differs by a maximum of 2 mm from the inner rim of the mixing chamber.

17. The mixing machine according to claim 1, wherein the cleaning plate is set up at an angle of 65° to 85 relative to the bottom plate of the mixing chamber.

18. The mixing machine according to claim 1, wherein the top plate of the mixing chamber is removable, the side walls of the mixing chamber are movable, and the push blades, the mixing blades, or both may be dismantled for external cleaning or replacement.

19. A method for mixing a homogeneous mixture with one or more components using a mixing machine according to claim 1, wherein the dry homogeneous mixture in the mixing chamber is added via an input channel at the level of the push zone (A), wherein one or more components are added via input channels at the level of the mixing zone (B), and wherein using a forward pushing rotation movement of the rotors and the matching push blades, mixing blades, or both, the dry homogenous mixture and the one or more components added via the input channels are mixed to a homogeneous mixture and pushed forward in the direction of the outlet mouth.

20. A method for the cleaning of a mixing machine as described in claim 1, wherein the cleaning system is set to function immediately after every mixing cycle and wherein the push blades and the mixing blades slide sideways via the transit channels and leave the mixing chamber this way, and wherein the cleaning plate subsequently travels downstream in the mixing chamber.

* * * * *